US010120797B1

(12) United States Patent
Foley et al.

(10) Patent No.: US 10,120,797 B1
(45) Date of Patent: Nov. 6, 2018

(54) MANAGING MAPPING METADATA IN STORAGE SYSTEMS

(71) Applicant: EMC IP Holding Company LLC, Hopkinton, MA (US)

(72) Inventors: Robert P. Foley, Clinton, MA (US); Peter Puhov, Shrewsbury, MA (US); Lili Chen, Hopkinton, MA (US); Marc Cassano, Mendon, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 24 days.

(21) Appl. No.: 15/281,365

(22) Filed: Sep. 30, 2016

(51) Int. Cl.
*G06F 12/02* (2006.01)
*G06F 3/06* (2006.01)
*G06F 11/10* (2006.01)

(52) U.S. Cl.
CPC .......... *G06F 12/0292* (2013.01); *G06F 3/061* (2013.01); *G06F 3/0619* (2013.01); *G06F 3/0659* (2013.01); *G06F 3/0665* (2013.01); *G06F 3/0689* (2013.01); *G06F 11/1004* (2013.01); *G06F 11/1076* (2013.01); *G06F 2211/104* (2013.01); *G06F 2212/1016* (2013.01); *G06F 2212/1032* (2013.01); *G06F 2212/152* (2013.01); *G06F 2212/403* (2013.01)

(58) Field of Classification Search
CPC .. G06F 12/0292; G06F 3/0619; G06F 3/0665; G06F 3/0689; G06F 11/1004; G06F 2211/104; G06F 11/1076
See application file for complete search history.

(56) References Cited

U.S. PATENT DOCUMENTS

| 5,497,457 | A | * | 3/1996 | Ford | G06F 11/1076 714/15 |
| 5,737,344 | A | * | 4/1998 | Belser | G11B 20/1833 714/6.24 |
| 5,819,109 | A | * | 10/1998 | Davis | G06F 11/1008 710/15 |
| 6,105,103 | A | * | 8/2000 | Courtright, II | G06F 3/0608 707/999.202 |
| 6,553,511 | B1 | * | 4/2003 | DeKoning | G06F 11/1076 707/999.1 |
| 6,742,081 | B2 | * | 5/2004 | Talagala | G06F 11/1076 711/113 |
| 6,775,792 | B2 | * | 8/2004 | Ulrich | G06F 9/5083 711/114 |
| 2002/0161972 | A1 | * | 10/2002 | Talagala | G06F 11/1076 711/114 |
| 2004/0194151 | A1 | * | 9/2004 | Earhart | G11B 23/0305 725/135 |
| 2009/0172244 | A1 | * | 7/2009 | Wang | G06F 11/1076 711/5 |
| 2009/0187786 | A1 | * | 7/2009 | Jones | G06F 11/1076 714/6.32 |
| 2015/0199236 | A1 | * | 7/2015 | Selivanov | G06F 11/1096 714/6.24 |

(Continued)

*Primary Examiner* — Joseph D Torres
(74) *Attorney, Agent, or Firm* — Krishnendu Gupta; Jason Reyes; Deepika Bhayana

(57) ABSTRACT

A method is used in managing mapping metadata in storage systems. A request is received to access data organized on a storage device of a storage system. Checksum information is used for validating the data. The checksum information is stored on the storage system separate from a location at which the data has been stored.

18 Claims, 8 Drawing Sheets

(56) References Cited

U.S. PATENT DOCUMENTS

2017/0046221 A1\* 2/2017 Bandic ................ G06F 11/1044
2017/0091022 A1\* 3/2017 Khan .................. G06F 11/1068
2017/0255508 A1\* 9/2017 Lee .................... G06F 11/1016

\* cited by examiner

300

| LOGICAL BLOCK ADDRESS | PHYSICAL BLOCK ADDRESS | CHECKSUM | ..... |
|---|---|---|---|
| LBA-1 | PBA-1 | CHECKSUM-1 | |
| LBA-2 | PBA-2 | CHECKSUM-2 | |
| LBA-3 | PBA-3 | CHECKSUM-3 | |
| ⋮ | ⋮ | ⋮ | ⋮ |
| LBA-N | PBA-N | CHECKSUM-N | |

FIG. 7

MANAGING MAPPING METADATA IN STORAGE SYSTEMS

BACKGROUND

Technical Field

This application relates to managing mapping metadata in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

As described above, applications access and store data incrementally by use of logical storage array partitions, known as logical units (LUNs). LUNs are made up of collections of storage blocks of a RAID array and are exported from the RAID array for use at the application level.

There are a number of different RAID (Redundant Array of Independent or Inexpensive Disks) levels and techniques that may be used in connection with providing a combination of fault tolerance and/or improved performance for data storage devices. Different RAID levels (e.g., RAID-1, RAID-5, RAID-6, and the like) may provide varying degrees of fault tolerance. Further, RAID parity schemes may be utilized to provide error detection during the transfer and retrieval of data across a storage system.

Generally, a RAID system is an array of multiple disk drives which appears as a single drive to a data storage system. A goal of a RAID system is to spread, or stripe, a piece of data uniformly across disks (typically in units called chunks), so that a large request can be served by multiple disks in parallel. For example, RAID-5 techniques can be used in connection with a data storage system to protect from a single device failure.

In a particular RAID-5 context, for example, which comprises a storage array of five disk modules, each disk has a plurality of "N" data storage sectors, corresponding sectors in each of the five disks being usually referred to as a "stripe" of sectors. With respect to any stripe, 80% of the sector regions in the stripe (i.e., in a 5 disk array effectively 4 out of 5 sectors) is used for user data and 20% thereof (i.e., effectively 1 out of 5 sectors) is used for redundant, or parity, data. The use of such redundancy allows for the reconstruction of user data in the event of a failure of a user data sector in the stripe.

As users access content on these RAID arrays, IO requests will be processed. Further, each access of content may be validated by using metadata such as checksums. Unfortunately, when a large quantity of IO requests are received by RAID arrays, validating content for such large quantity of IO requests adversely impact performance of such RAID arrays.

SUMMARY OF THE INVENTION

A method is used in managing mapping metadata in storage systems. A request is received to access data organized on a storage device of a storage system. Checksum information is used for validating the data. The checksum information is stored on the storage system separate from a location at which the data has been stored.

BRIEF DESCRIPTION OF THE DRAWINGS

Features and advantages of the present technique will become more apparent from the following detailed description of exemplary embodiments thereof taken in conjunction with the accompanying drawings in which:

FIGS. 4-7 are diagrams illustrating in more detail components that may be used in connection with techniques herein.

DETAILED DESCRIPTION OF EMBODIMENT(S)

Figure 1:
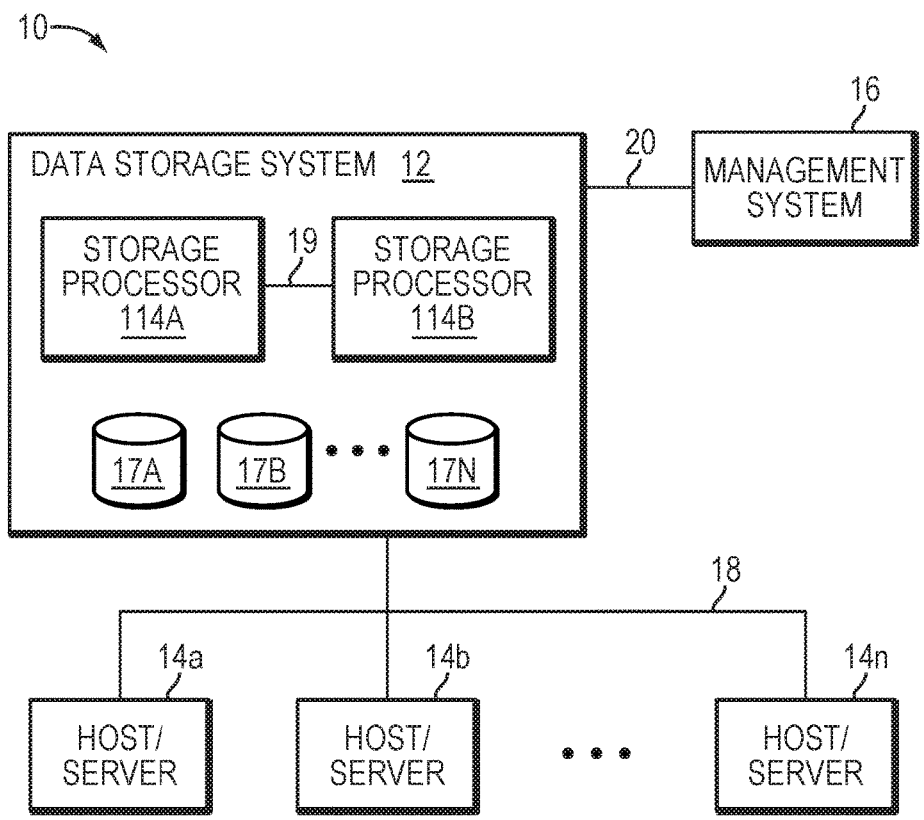
FIGS. 1-2 are examples of an embodiment of a computer system that may utilize the techniques described herein.

Described below is a technique for use in managing mapping metadata in storage systems, which technique may be used to provide, among other things, receiving a request to access data organized on a storage device of a storage system, and using checksum information for validating the data, where the checksum information is stored on the storage system separate from a location at which the data has been stored.

Generally, a storage pool is a collection of storage that is provisioned for a logical unit. A storage pool may be a collection of disks, which may include disks of different types. Storage pools may further be subdivided into slices; for example, a 1 gigabyte (GB) slice may be the allocation element for a logical unit. Further, a slice may be 256 megabytes (MB) in size. A slice may be considered the smallest element that can be tracked and moved. A storage pool may be a collection of storage containers. A storage container may be a unit of storage including a set of storage extents. A storage extent is a logical contiguous area of storage reserved for a user requesting the storage space.

A disk may be a physical disk within the storage system. A LUN may be a logical unit number which is an identifier for a Logical Unit. Each slice of data may have a mapping to the location of the physical drive where it starts and ends.

Further, a pool of storage devices may be organized into multiple RAID groups, and each RAID group may further divided be into a number of LUs from which slices are allocated to one or more mapped LUs for use by users of a storage array. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to as "direct mapped LUN") is a fully provisioned mapped LU with coarse mapping. Even though a DLU is seen as fully provisioned by a user, internally storage space is allocated on as needed basis. TLUs may have a logical size that is larger than the actual storage size consumed by the TLUs. The actual consumed size is determined by the number of slices actually allocated to a TLU. Thus, an amount of storage space presented to a host of a data storage system using a thin logical volume may be different than the amount of storage space actually allocated to the thin logical volume. The slices that are allocated to a mapped LUN may be physically located anywhere in a storage array.

File system mapping logic (also referred to herein a file mapping component") in a storage system presents a volume organized on a storage device as a file system to a host and provides a thin provisioning service by adding fixed sized slices to a file system when the file system needs storage space to write data. Thus, as described above herein, virtual address space of a file system may be apportioned into fixed sized sections or chunks, each chunk being a slice. Thus, as described above herein, virtual address space of a file system may be apportioned into fixed sized sections or chunks, each chunk being a slice. A file system may dynamically add or remove slices based on the amount of space consumed by the file system. Further, a file system manages mapping information for mapping its virtual address space with physical location of slices on a storage device.

As described herein, RAID (Redundant Array of Independent Disks) provides a way of storing the same data in different places thereby creating redundancy on multiple storage disks. By placing data on multiple storage disks, input/output (I/O) operations can overlap in a balanced way thereby improving performance. Further, storing data redundantly on multiple storage disks also increases fault tolerance. Generally, RAID is a data storage virtualization technology that combines multiple physical disk drive components into a single logical unit for the purposes of data redundancy, performance improvement, or both.

Data integrity is of a high importance for a user of a storage system regarding storage security and reliability. One of the methods to determine whether data is corrupted (indicating it has changed) is to use a checksum. A checksum is a value that is computed for a block of data for the purpose of detecting errors which may have been introduced in a storage system during storage of data or its transmission. Further, a checksum value may be computed by a hash function and referred to as a hash value which may be in any one of the formats such as a file, a text string, or a hexadecimal string. One of the example of hash is MD5 (Message-Digest algorithm 5) hash. Thus, a checksum is a type of redundancy check that is used to detect errors in data and is a calculated value that is used to determine the integrity of the data such that if the data changes, the value of its checksum changes too.

Generally, checksums may be computed for data stored on a storage device (e.g., disk) and may be stored persistently with the data. Further, data integrity for data may be verified by comparing the stored checksum for the data with the newly computed checksum value for the data upon receiving a request to read data. Thus, a checksum value for data may be used to check data integrity of stored data to determine whether the data has been modified or changed in any way over time. Data may be modified in any number of ways. It may be infected by viruses, packet loss when transferring through networks, accidental or intentional human changes of data, or anything else.

Conventionally, a storage system computes checksum for each data portion and respective checksum for each data portion is appended to/included within respective data portion. In such a conventional system, for example, a data portion may use 520 bytes of storage space on a storage disk and use additional 8 bytes of storage space adjacent to the data portion for storing metadata such as checksum for the data portion. In such a conventional system, in the event that one or more of data portions are read/retrieved by a storage system upon receiving a read request, the storage system performs additional read operations to access respective checksums associated with one or more of such data portions. Further, in such a conventional system, a storage system first compare respective checksums retrieved from a storage device to their related data portions to confirm that the data included within these portions is indeed valid. Thus, in such a conventional system, an additional I/O operation is performed by a storage system to access checksum for a data object upon receiving a request to read contents of the data object. Thus, in such a conventional system, upon receiving a large number of I/O requests to read/access a large number of data portions, a large number of additional I/O operations are performed to access checksums associated with each data portion to validate consistency of such data portions.

Further, in such a conventional system, data may become inconsistent upon occurrence of a misdirected write. A write request may write new data for a data portion at a different location on a storage device instead of updating the data portion stored at its original location thereby making contents of the data portion stored at the original location a stale data. Such a write request is referred to herein as "misdirected write". In such a conventional system, when a misdirected write occurs, data for a data object stored at its original location includes valid checksum that matches contents of the data and would be considered consistent data by a storage system even though the contents of the data object are not up-to-date and the updated content have been stored at a different location.

By contrast, in at least some implementations in accordance with the technique as described herein, checksum associated with data of a data portion is stored at a location separate from the location at which the data portion resides. In at least some implementations in accordance with the technique as described herein, checksum associated with data of a data portion is stored in mapping metadata such as a map that is located at a different location from the location at which the data resides on a storage device. Thus, in at least some implementations in accordance with the technique as described herein, data is stored on a storage device without a checksum appended to or included with the data.

In at least some implementations in accordance with the technique as described herein, a mapped storage system store metadata in a way that enables the mapped storage system to determine where data resides on the mapped storage system. Consequently, a mapped storage system includes a mapping of a logical block address ("LBA") addressable by a host system to a logical block address for the location of data on the mapped storage system. Further, such mappings are stored in metadata which may be organized as a map. In at least some implementations in accordance with the technique as described herein, a mapping metadata (such as a map or a mapping table) may also include a checksum for a data portion along with an address mapping for such data portion. A checksum for a data portion enables a storage system to determine at the time the data portion is accessed/read/retrieved whether contents of the data portion are accurate (also referred to herein as "valid", "correct", or "consistent"). In at least one embodiment of the current technique, such checksum stored separate from data may be used by other components of a storage system (e.g., RAID system) to make decisions based on correctness of the data. Thus, in at least one embodiment of the current technique, when a request is received by a storage system to write data, checksum for the data is determined, the data is mapped to a location on a storage device at which the data will be stored, a mapping metadata (such as a map) is updated with an address mapping for the data indicating the location at which the data is stored and the checksum associated with the data. Further, in at least one embodiment of the current technique, a storage system component (e.g., RAID system) may use checksums stored in the mapping metadata to determine consistency of data portions and reconstruct an inconsistent data portion upon determining that a data portion has become inconsistent. Further, in at least one embodiment of the current technique, checksums stored in the mapping metadata (such as a map) may also be used by a compression component of a storage system for compressing data. In at least one embodiment of the current technique, a checksum for data of a data portion is determined prior to compressing the data and stored in the mapping metadata such that when the data is decompressed, the checksum that has been stored separate from the data is used to validate the data.

Further, in at least one embodiment of the current technique, when a data is accessed/retrieved/read from a storage device, the mapping metadata is accessed to determine location of the data by evaluating the address mapping for the data. In at least one embodiment of the current technique, because checksum for the data is stored within the mapping metadata, the checksum is available to validate data without having to read checksum from the storage device thereby eliminating an additional I/O operation for retrieving checksum value from the storage device as performed in a conventional system. Thus, in at least one embodiment of the current technique, a storage system successfully handles misdirected writes by storing checksum in a mapping metadata separate from the location at which data is stored. Thus, in at least one embodiment of the current technique, if a misdirected write occurs upon writing data to a storage device, updated checksum for the data is stored in the mapping metadata indicating that data stored at a previous location does not matches the checksum stored in the mapping metadata thereby enabling a storage system to detect an error that generally occurs upon receiving a misdirected write.

In at least some implementations in accordance with the current technique as described herein, the use of the managing mapping metadata in storage systems technique can provide one or more of the following advantages: improving efficiency of a storage system by efficiently using storage resources in the storage system, improving performance and memory consumption in a storage system by storing checksum in a mapping metadata, improving performance of I/O operations by eliminating additional read operations to access checksums for data portions, improving reliability of a storage system by storing checksum separate from data thereby enabling the storage system to successfully handle errors associated with misdirected writes, and improving efficiency of I/O operations by storing checksum in mapping metadata which enables a storage system to have access to checksum when information from mapping metadata is accessed for determining location of data.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage system s 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX™ or VNXe™ data storage array by EMC Corporation of Hopkinton, Mass., including a plurality of data storage devices 17a-17n and at least two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX™ or VNXe™ data storage system mentioned above may include at least two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts, other data storage systems, management system, and other components connected thereto. Each of the SPs may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two SPs. Upon the occurrence of failure of one the SPs, the other remaining SP may handle all processing typically performed by both SPs.

Storage operations performed in a data storage system 12 may include I/O operations which are received by the data storage system 12 from an external client, such as a host. Depending on the data storage configuration, the single host I/O operation, such as for a write operation, may result in more than one write operation to one or more physical drives on the data storage system. For example, if the host write is directed to a logical device, such as a LUN, having storage provisioned from a RAID group having a RAID-1 mirroring configuration with two physical drives, then a single front end or host I/O to the LUN results in two back-end physical device writes to each of the two mirrored physical devices of the storage system comprising the RAID group.

Figure 2:
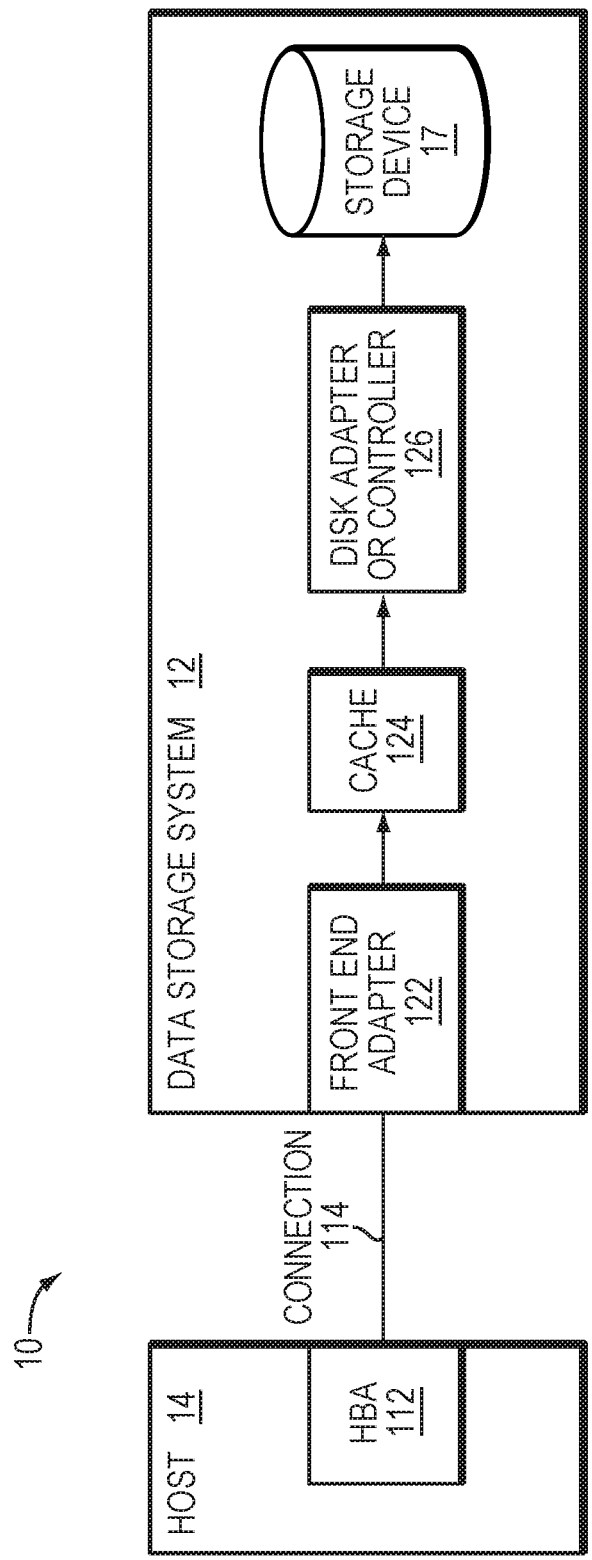

With reference to FIG. 2, shown is an example 10 illustrating components of a system that may be used in an embodiment in accordance with techniques herein. The example 10 includes a simplified view of components of a system as described above. The example 10 includes a host 14 with an Host Bus Adapter ("HBA") 112. The host 14 communicates with data storage system 12 over connection 114. Connection 114 may be, for example, a network connection between the HBA 112 and a front end adapter 122 of the data storage system 12. As described above, a front end adapter 122 may be, for example, a Fibre Channel Adapter ("FA") or other adapter which facilitates host communication. The data storage system 12 also includes a cache 124, a Disk Adapter ("DA") or storage controller 126 and one or more physical storage devices 17 (e.g., rotating disks or solid state devices (SSDs) such as a flash drive).

Components of the data storage system 12, such as a Host Adapter ("HA"), which may communicate with a host may also be referred to as front end components. Within the data storage system 12, components, which may be characterized as backend components, communicate with a front end component. An example of a backend component is a DA 126. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the HAs, and the cache memory 124. An embodiment, for example, may use one or more internal busses and/or communication modules. For example, the cache memory 124 may be used to facilitate data transfers and other communications between the DAs and HAs in a data storage system.

Data storage system 12 may include a plurality of storage devices such as disk devices or volumes included in an arrangement consisting of n rows of disks or more generally, data storage devices, 17a-17n. In this arrangement, each row of disks may be connected to a disk adapter ("DA") or director responsible for the backend management of operations to and from a portion of the disks 17. In a data storage system such as by EMC Corporation, a backend DA may also be referred to as a disk controller. The DA may perform operations such as reading data from, and writing data to, the physical devices which are serviced by the DA.

The host 14 may issue an I/O operation to the data storage system over connection 114. For example, the host may issue a write operation to write data to a portion of storage device 17. In one embodiment, the data of the write operation may first be stored in cache 124 and then de-staged at a later point in time by DA 126 to the physical storage device 17. The foregoing host write operation is an example of an I/O operation of the type described above issued by the client. The single client I/O operation may result in actually writing data to one or more storage devices depending on how the device to which the I/O is directed is configured. When performing a read I/O operation received by the front end adapter 122, processing may first determine whether the data requested is already in cache 124 (thereby resulting in a cache hit or read hit). If the requested read data is in cache 124, the data is retrieved from cache 124 and returned to the host 14. Thus, a read resulting in a cache hit may be serviced without having to access the physical storage device 17 for the data. If the requested data is not in cache 124, the data is retrieved by the DA 126 from the storage device 128, stored in cache 124, and then returned by the front end adapter 122 to the host 14.

Examples of cache 124 may include but are not limited to a volatile, solid-state, cache memory system (e.g., a dynamic RAM cache memory system) and/or a non-volatile, solid-state, cache memory system (e.g., a flash-based, cache memory system).

As described in more detail in following paragraphs and figures and with reference to FIG. 1, each of the SPs 114A, 114B may have its own instance of a data model, such as an object model, that represents various logical and physical aspects of the data storage configuration. The data model may include objects representing physical and logical entities in the data storage system. For example, objects may exist in the model representing the data storage system configuration whereby the objects may represent physical entities such as the physical drives (PDs) and logical entities such as a RAID Group, a LUN, and the like.

Figure 3:
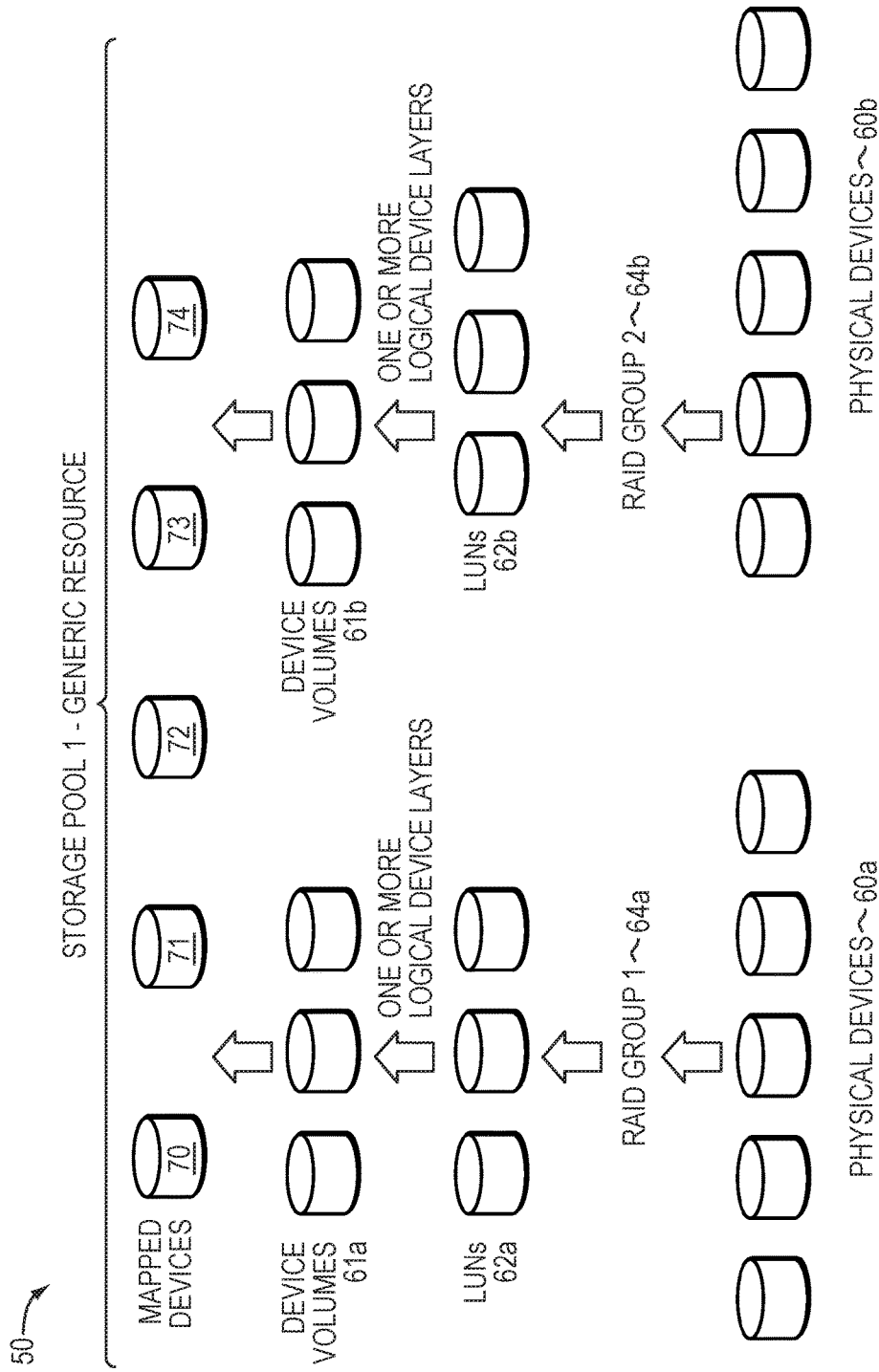
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. A disk may be a physical disk within the storage system. A LUN may be a logical unit number which is an identifier for a Logical Unit. Each slice of data may have a mapping to the location of the physical drive where it starts and ends.

Figure 4:
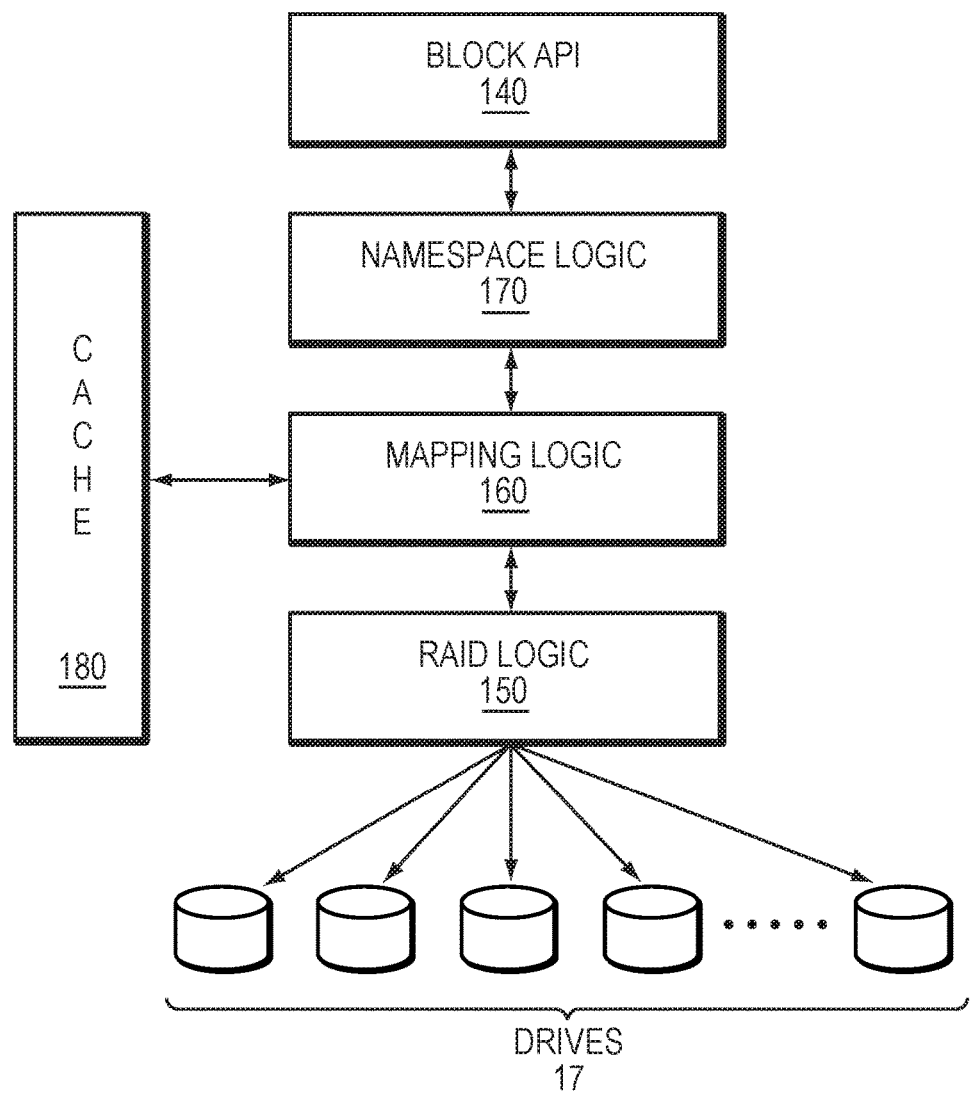

Referring to FIG. 4, shown is more detailed representation of components that may be included in an embodiment using the techniques herein. With reference also to FIGS. 1-3, namespace logic component 170 exports LUNs to a host and mapping logic component 160 presents storage extents to namespace logic component 170 for provisioning storage space from the storage extents to a LUN presented to a host by namespace logic component 170. Further, RAID logic component 150 consumes storage from storage devices 17 and provides such storage to mapping logic component 160 which further provides such storage as a storage extent to the namespace logic component 170. In at least one embodiment of the current technique, mapping logic component 160 sends a request to perform a RAID storage operation to RAID logic component 150 in accordance with techniques described herein.

In at least some systems, for example, host 14 sends an I/O request through HBA 112 to data storage system 12. Based on the I/O request, data storage system 12 sends corresponding data requests to disk drives 17 through DA 126 and RAID logic component 150 where RAID logic component 150 is leveraged to provide management and access to storage of disk drives 17. Generally, a storage operation such as an I/O request to RAID logic 150 includes information such as logical block address, block count, block size, the type of operation (e.g., read, write), volume ID, and the scatter-gather list for data.

Figure 5:
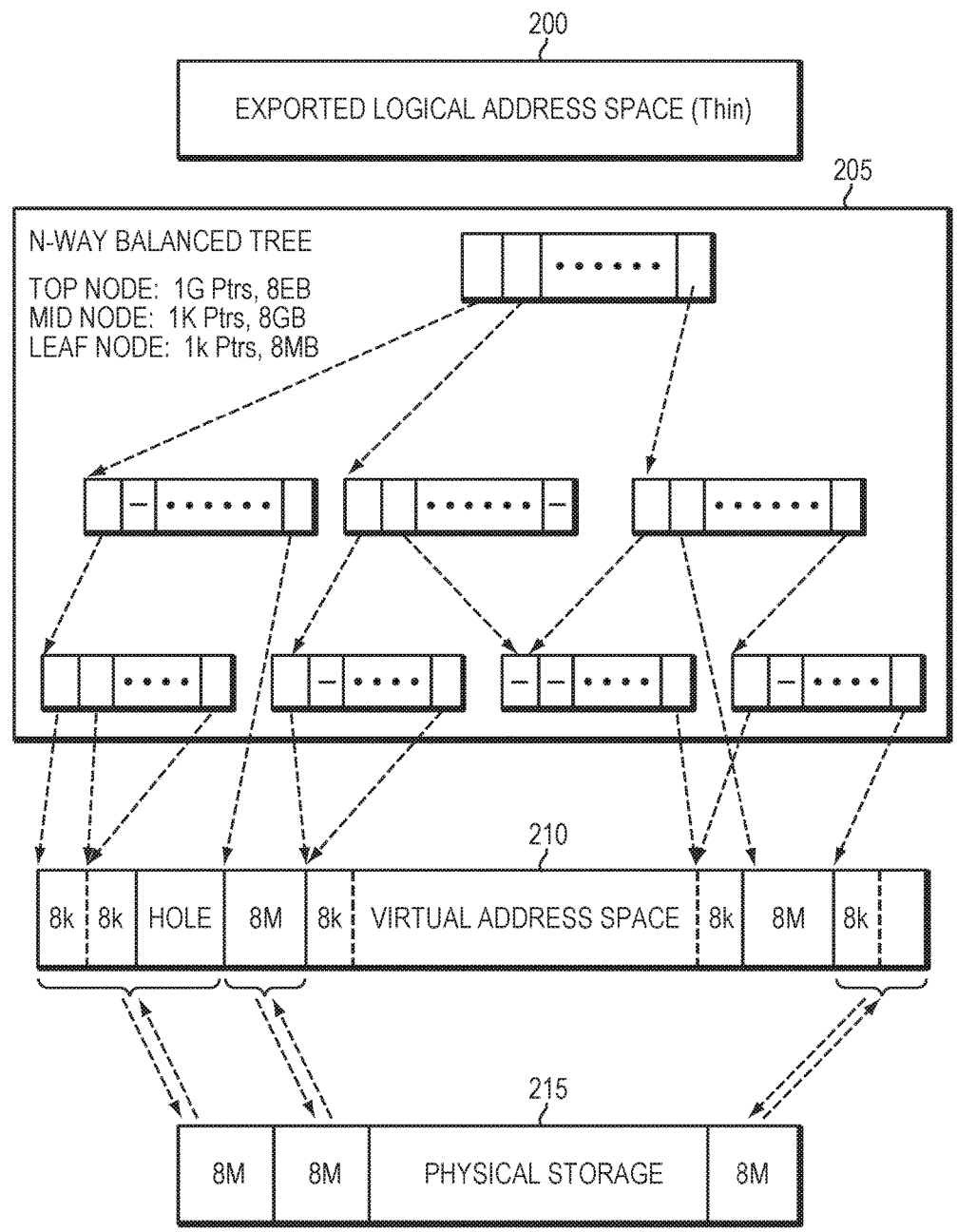

Referring to FIG. 5, shown is more detailed representation of components that may be included in an embodiment using the techniques herein. With reference also to FIGS. 1-4, FIG. 5 illustrates data structures used for mapping logical address space for a data object to physical storage of such data object in a storage system. In at least one embodiment of the current technique, a storage system 12 presents a logical storage space to one or more applications running on a host where different portions of the logical storage space may or may not have corresponding physical storage space associated therewith. Such logical address space may be exported to a user or a host in form of a mapped logical object 200 such as a "thin logical unit" (also referred to herein as "thin LUN"). However, the mapped device is not mapped directly to physical storage space 215. Instead, portions of the mapped storage device for which physical storage space exists are mapped to data devices such as logical volumes 210, which are logical devices that map logical storage space of the thin LUN 200 to physical storage space 215 on physical devices of the storage system 12. A logical volume provides an additional layer of mapping between the thin LUN 200 and the physical storage 215 by organizing slices of storage as a virtual address space 210. Further, portions of virtual address space of a logical volume 210 may be organized in a hierarchy of mapping pointers 205. Further, such a virtual address space may be organized as a file. Further, holes depicted in virtual address space 210 in FIG. 5 are slice-size areas not currently provisioned. As the actual size of the thin LUN 200 increases, which is reflected in holes being replaced with slices of physical storage space, the size of the logical volume 210 is increased accordingly.

Figure 6:
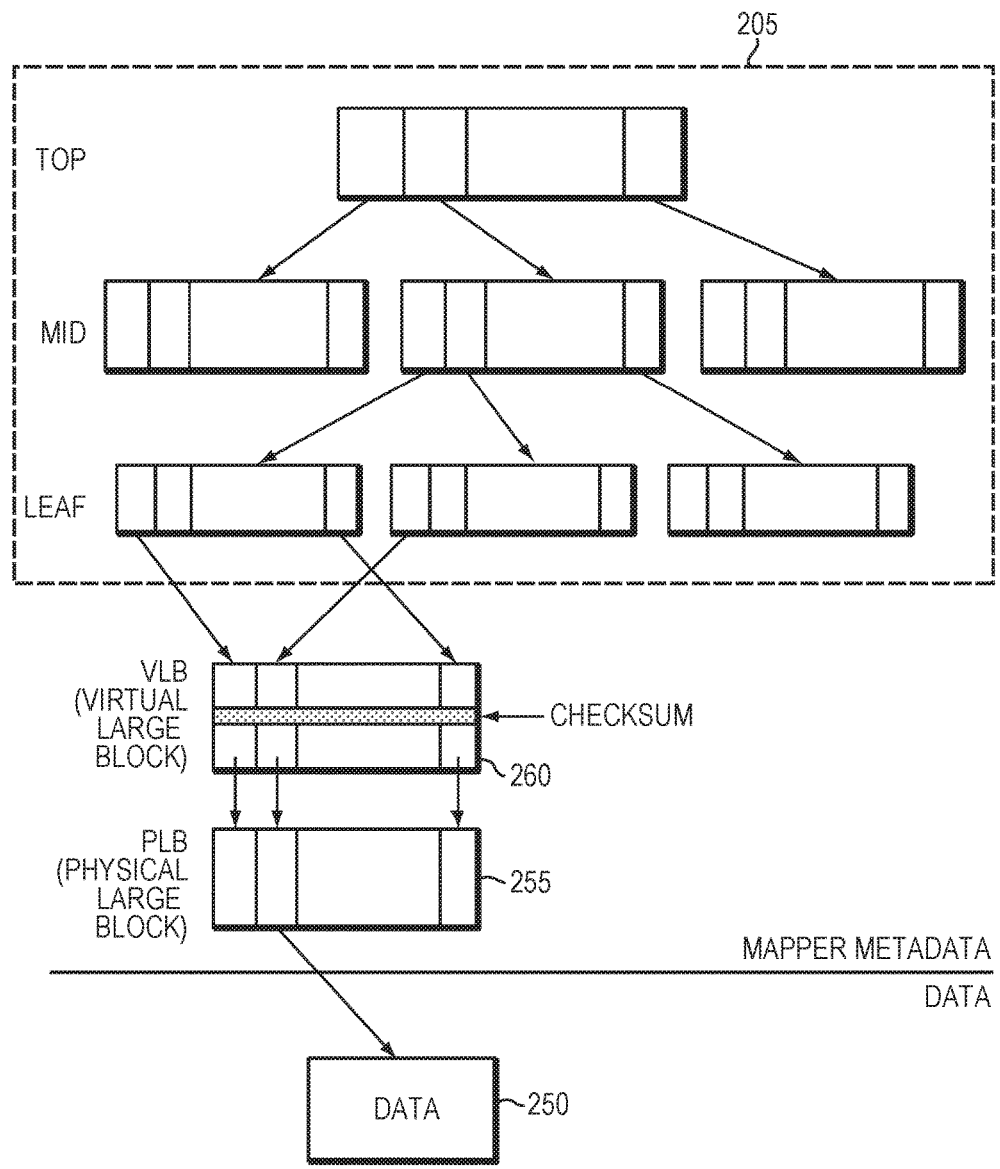

Referring to FIG. 6, shown is more detailed representation of components that may be included in an embodiment using the techniques herein. With reference also to FIGS. 1-5, each data object 250 stored on a storage device (e.g., a disk) of a storage system 12 is associated with a physical block address 255 which is then mapped to a virtual block address 260. Thus, a virtual block may include a set of mapping objects, each mapping object associated with a logical block address, each logical block address being mapped to a physical block address. Further, virtual block may be organized as a hierarchy of mapping objects 205. In at least one embodiment of the current technique, mapping metadata which includes a mapping of a logical block address to a physical block address of a data portion may also include checksum for such data instead of storing the checksum value with the data.

It should be noted that a data portion may be a LUN, a volume, a file, a slice, a data block or any other data object.

Referring to FIG. 7, shown is more detailed representation of components that may be included in an embodiment using the techniques herein. With reference also to FIGS. 1-6, in at least one embodiment of the current technique, a mapping metadata such a mapping table 300 includes a mapping of physical block address of a data object to a logical block address of the data object. Further, such mapping table 300 also includes checksum for each data object for which address mapping is included in the mapping table 300.

Figure 8:
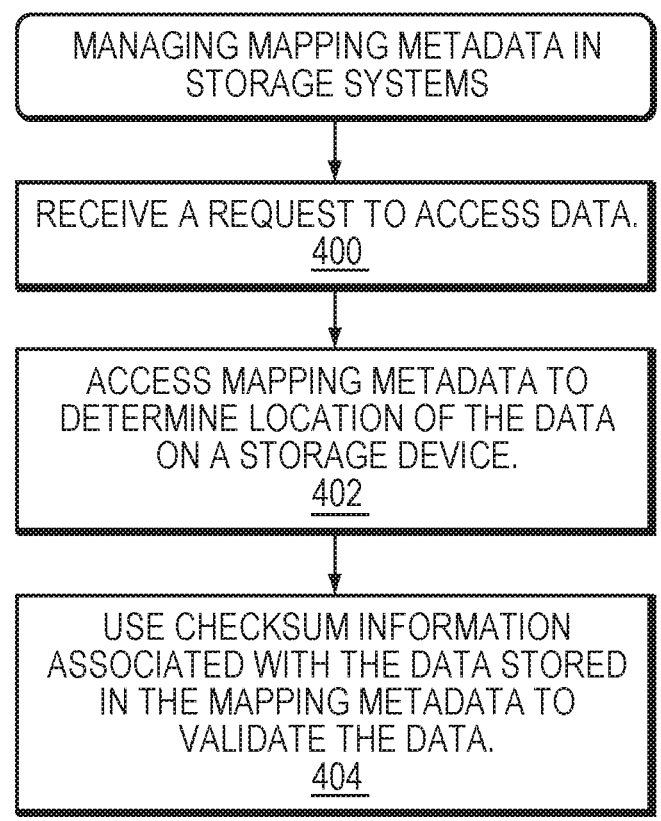
FIG. 8 is a flow diagram illustrating processes that may be used in connection with techniques herein.

Referring to FIG. 8, shown is a more detailed flow diagram illustrating managing mapping metadata in storage systems. With reference also to FIGS. 1-7, a request is received by a storage system to access data (step 400). A storage system may access a data object or a portion or data or a slice or data in any other format. The storage system accesses mapping metadata to determine physical location of the data on a storage device (step 402). When the storage system accesses the address mapping information for the data from the mapping metadata, such information also includes a checksum for the data. The checksum is then used to validate whether data is consistent (step 404).

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing mapping metadata in storage systems, the method comprising:
    receiving a request to access data organized on a storage device of a storage system;
    accessing mapping information for the data to determine a location of the data on the storage device, wherein the mapping information is organized as a map, wherein the map stores mapping of a logical block address of the data addressable by a host system to a logical block address indicating the location at which data is stored on the storage device and checksum information associated with the data;
    accessing the checksum information associated with the data from the mapping information; and
    using checksum information accessed from the map for validating the data without having to read checksum from the storage device thereby eliminating an additional I/O operation for retrieving checksum value from the storage device, wherein the checksum information is stored on the storage system in the map separate from a location at which the data has been stored.

2. The method of claim 1, wherein the checksum information is stored with mapping information for the data, wherein the mapping information determines location of the data on the storage device.

3. The method of claim 2, wherein the mapping information includes a physical block address for a data object, a logical block address of the data object, and a checksum of the data object.

4. The method of claim 2, wherein the mapping information is organized as the map, the map including a set of entries, each entry of the set of entries including address mapping for a data object and a checksum for the data object.

5. The method of claim 1, wherein the request to access the data includes a read IO request.

6. The method of claim 1, wherein the request to access the data includes a write IO request.

7. The method of claim 1, wherein the storage system includes a disk drive system comprising a plurality of Redundant Array of Inexpensive Disks (RAID) systems, each RAID system of the plurality of RAID systems having a first disk drive and a second disk drive.

8. The method of claim 1, wherein a logical address space of the storage system is exported to a user of the storage system as a mapped logical object, wherein the mapped logical object comprises a set of slices, each slice of the set of slices is a logical representation of a subset of physical disk storage.

9. The method of claim 1, wherein the storage system includes a RAID logic component, wherein RAID logic component provides management and access to storage space of a set of disk drives.

10. A storage system for use in managing mapping metadata in storage systems, the system comprising a storage device and a processor configured to:
receive a request to access data organized on a storage device of a storage system; and
access mapping information for the data to determine a location of the data on the storage device, wherein the mapping information is organized as a map, wherein the map stores mapping of a logical block address of the data addressable by a host system to a logical block address indicating the location at which data is stored on the storage device and checksum information associated with the data;
access the checksum information associated with the data from the mapping information; and
use checksum information accessed from the map for validating the data without having to read checksum from the storage device thereby eliminating an additional I/O operation for retrieving checksum value from the storage device, wherein the checksum information is stored on the storage system in the map separate from a location at which the data has been stored.

11. The system of claim 10, wherein the checksum information is stored with mapping information for the data, wherein the mapping information determines location of the data on the storage device.

12. The system of claim 11, wherein the mapping information includes a physical block address for a data object, a logical block address of the data object, and a checksum of the data object.

13. The system of claim 11, wherein the mapping information is organized as the map, the map including a set of entries, each entry of the set of entries including address mapping for a data object and a checksum for the data object.

14. The system of claim 10, wherein the request to access the data includes a read IO request.

15. The system of claim 10, wherein the request to access the data includes a write IO request.

16. The system of claim 10, wherein the storage system includes a disk drive system comprising a plurality of Redundant Array of Inexpensive Disks (RAID) systems, each RAID system of the plurality of RAID systems having a first disk drive and a second disk drive.

17. The system of claim 10, wherein a logical address space of the storage system is exported to a user of the storage system as a mapped logical object, wherein the mapped logical object comprises a set of slices, each slice of the set of slices is a logical representation of a subset of physical disk storage.

18. The system of claim 10, wherein the storage system includes a RAID logic component, wherein RAID logic component provides management and access to storage space of a set of disk drives.

* * * * *